United States Patent [19]
Miyahara et al.

[11] Patent Number: 6,155,690
[45] Date of Patent: Dec. 5, 2000

[54] OPTICAL AXIS CORRECTION DEVICE

[75] Inventors: Kiyohiko Miyahara, Kanagawa; Kazuhiko Otsuka, Chiba; Yujiro Ito; Toshihisa Iriyama, both of Kanagawa, all of Japan

[73] Assignee: Sony Corporation, Tokyo, Japan

[21] Appl. No.: 09/325,184

[22] Filed: Jun. 3, 1999

[30] Foreign Application Priority Data

Jun. 5, 1998 [JP] Japan .................................. 10-156523

[51] Int. Cl.[7] .................................................. G02B 7/182
[52] U.S. Cl. .......................... 359/872; 359/874; 359/877
[58] Field of Search ................................... 359/872, 874, 359/876, 877, 838

[56] References Cited

U.S. PATENT DOCUMENTS

| | | | |
|---|---|---|---|
| 4,664,487 | 5/1987 | Tam ......................................... | 350/486 |
| 4,680,522 | 7/1987 | St. Clair et al. ......................... | 318/664 |
| 4,824,253 | 4/1989 | Butler et al. ............................. | 356/350 |
| 5,751,460 | 5/1998 | Harrell et al. ............................ | 359/198 |

*Primary Examiner*—Cassandra Spyrou
*Assistant Examiner*—Craig Curtis
*Attorney, Agent, or Firm*—Frommer Lawrence & Haug, LLP.; William S. Frommer; Matthew K. Ryan

[57] ABSTRACT

In an optical axis correction device for correcting an optical axis within an optical spatial transmission device, a displacement of focal point can be prevented and a responding speed in rotation of the mirror can be made fast. As the incident light is reflected against the reflection surface of the mirror and radiated against the position sensing sensor, a displacement amount ΔS between the incident point P1 on the position sensing sensor and the reference position P0 is detected at the optical axis correction device. In order to correct the optical axis only by the amount of displacement ΔS, the Y-axis driving mechanism is driven to change an angle of the reflection surface of the mirror. At this time, the position of the reflecting portion on the reflection surface in a direction of Z-axis is prevented from being displaced. For example, a driving force of "−2" is applied to the first Y-axis driving mechanism and concurrently a state of "±0" is held at the second Y-axis driving mechanism. With such an arrangement as above, it is possible to rotate the mirror in the same direction and by the same amount only as those of the case in which the driving force "−1" is applied to the first Y-axis driving mechanism and the driving force "+1" is applied to the second Y-axis driving mechanism without being displaced in a direction of the Z-axis.

7 Claims, 13 Drawing Sheets

OPTICAL AXIS CORRECTION DEVICE

BACKGROUND OF THE INVENTION

1. Field of the Invention

This invention relates to an optical axis correction device for correcting an optical axis within an optical spatial transmission device and more particularly to an optical axis correction device for correcting an optical axis by controlling a reflection angle of a mirror.

2. Description of the Related Art

In recent years, there has been vigorously performed to study a practical application of communication through a spatial transmission with light due to a lack of resources of electric wave or the fact that a troublesome procedure is required for installing a communication network of wireless system or wired system. However, it is an actual state that a device having a sufficient performance has not been provided yet in regard to an optical spatial transmission device over a long distance of several kilo-meters.

FIG. 12 illustrates a schematic configuration of an optical system segment of an optical spatial transmission device capable of performing an interactive optical communication. In this optical spatial transmission device, a beam of a semiconductor laser 31 modulated in response to a transmission signal is changed into a parallel beam by a lens 32 and is incident to a beam splitter 33. The incident beam is further incident to a concave lens 34 at an optical input/output side by a beam splitter 33, the beam expanded by the lens 34 is changed into a parallel beam by a lens 35 constituting a major lens segment together with the lens 34 and then outputted toward the optical spatial transmission device to be transmitted.

To the contrary, the beam received at the mating side is received by the lens 35. This beam passes through the beam splitter 33 after it is changed into a parallel beam by the lens 34 and then the beam is incident to the beam splitter 36. The beam splitter 36 divides the incident beam into a position sensing side and a receiving side. The beam divided to the position sensing side is collected by a lens 37 and is incident to the position sensing sensor 38. The position sensing sensor 38 detects a position of the incident light and transmits its detected signal to a control circuit (not shown). At the control circuit, an angle controlling operation to be described later is carried out in response to a sensing signal.

In turn, the beam divided into the receiving side is collected at the lens 39 and incident to the light receiving element 40. The light receiving element 40 converts the incident light into an electrical signal and sends it as a receiving signal to the receiving circuit. At the receiving circuit, the received signal is demodulated and recovered to its original data.

In this case, in order to perform an accurate beam transmission and receiving operation in such an optical system as above, it is always necessary to have an optical axis at the transmission side and an optical axis at the receiving side coincided to each other. However, the optical system is influenced by an external cause such as wind or the like, vibration generated within the device and further a variation in temperature or the like to cause the optical axes to be displaced from each other. In the case of a long distance communication, a minute displacement in optical axis may cause a certain trouble in communication, it becomes always necessary to correct an optical axis.

In view of the foregoing, there have been proposed various kinds of methods for correcting the optical axis.

FIG. 13 is a view for illustrating a first example of the prior art optical axis correcting device. An optical axis correcting device 50 has a barrel 51. Within the barrel 51 is integrally stored an optical system shown in FIG. 12. The barrel 51 is rotatably attached to an intermediate ring 52 by an X-axis receptor 54 around an X-axis. To the intermediate ring 52 is fixed an X-axis motor 53. Rotation of the X-axis motor 53 is transmitted to an X-axis receptor 54 through a driving gear 53a and a driven gear 54a. With such an arrangement as above, the barrel 51 is controlled in its rotation around the X-axis.

The intermediate ring 52 is attached to a base 55 by a Y-axis receptor 56 in such a way that it may be rotated around Y-axis. To the base 55 is fixed a Y-axis motor 57. Rotation of the Y-axis motor 57 is transmitted to a Y-axis receptor 56 through a driving gear 57a and a driven gear 56a. With such an arrangement as above, the barrel 51 is controlled in its rotation around the Y-axis. Rotation of the X-axis motor 53 and rotation of the Y-axis motor 57 are controlled in response to the sensing signal of the position sensing sensor 38 of the optical system shown in FIG. 12 in such a way that their optical axes may always be coincided to each other.

FIG. 14 is a view for showing a second example of the prior art optical axis correcting device. This optical axis correcting device is placed at the optical system shown in FIG. 12, wherein the same component elements as those shown in FIG. 12 are denoted by the same reference symbols to cause their description to be eliminated. Between the beam splitter 33 and the lens 34 are arranged an X-axis mirror 61, an X-axis motor 62 for controlling a rotation of the mirror, a Y-axis mirror 63 and a Y-axis motor 64 acting as a correction mechanism. The X-axis motor 62 and the Y-axis motor 64 are controlled in response to a sensing signal of the position sensing sensor 38, thereby angles of the X-axis mirror 61 and the Y-axis mirror 63 are controlled. With such an arrangement as above, an optical axis is corrected.

However, with the arrangement shown in FIG. 13, the entire barrel 51 is moved, so that its inertia mass is increased and a controlling response is inferior. In addition, as the bearing or the X-axis motor 53 and the Y-axis motor 57, it was required to provide component elements having a high accuracy and a high rigidity. Further, it was necessary to perform a correction of optical axis in a minute angle and it was required to provide a component having no back-lash in the motor or the like.

In addition, the configuration shown in FIG. 14 also required either mirror or motor, resulting in that their structures become complex and further it was required to provide a component element showing a high precision without having any back-lash.

In view of the above fact, the present applicant filed Japanese Patent Application No. Hei 10-014533 as an optical axis correction device for solving these problems.

FIG. 15 is a top plan view for showing a configuration of the optical axis correction device disclosed in Japanese Patent Application No. Hei 10-014533. The optical axis correction device 70 has a configuration in which a double-axis spring 71 is fixed to the upper surface of the frame 73 to be described later. The double-axis spring 71 is a thin disk-like member having a resiliency and it has concentric three rings 711, 712 and 713. The outer-most ring 711 is fixed to the frame 73. Between the outer ring 711 and an intermediate ring 712 is provided a clearance D11. The intermediate ring 712 is connected by Y-axis bridges 71a, 71b in such a state as one in which it can be twisted and rotated together with the outer ring 711. With such an arrangement as above, the intermediate ring 712 can be rotated around the Y-axis in respect to the outer ring 711.

Between the inner-most ring 713 and the intermediate ring 712 is provided a clearance D12. The inner ring 713 is connected to the intermediate ring 71 by the X-axis bridges 71c, 71d in such a way that it can be twisted and rotated. With such an arrangement as above, the intermediate ring 713 can be rotated around the X-axis in respect to the intermediate ring 712. In addition, a circular mirror 72 is fixed to the inner ring 713.

FIG. 16 is a sectional view taken along a line XII—XII of FIG. 15. As described above, the double-axis spring 71 is fixed to the upper surface of the frame 73. To the lower surface of the inner ring 713 is fixed a mirror holder 74. The mirror holder 74 holds a mirror 72. At this time, the mirror 72 is fixed in such a way that its reflection surface 72a is coincided with a central plane of plate thickness of the double-axis spring 71.

To the lower end surface of the frame 73 is fixed a base plate 75. Further, a base plate 77 is fixed through an annular spacer 76. On the base plate 75 are arranged every two X-axis driving mechanism 78X for rotating the mirror holder 74 around an X-axis and Y-axis driving mechanism 78Y for rotating the mirror holder 74 around a Y-axis, respectively. The X-axis driving mechanisms 78X and the Y-axis driving mechanisms 78Y are arranged at positions opposing against to each other over a crossing point between the X-axis and the Y-axis, i.e. an origin. However, in this case, one of the X-axis driving mechanisms 78X is placed at a reader's side in the figure, s o that it is not shown.

The Y-axis driving mechanism 78Y is a so-called moving magnet type voice coil motor and mainly this mechanism is comprised of a bobbin 78Ya fixed to the base plate 75, a coil 78Yb wound around the bobbin 78Ya, a yoke 78Yc fixed to the mirror holder 74 and a magnet 78Yd fixed inside the yoke 78Yc. Operation of the two Y-axis driving mechanisms 78Y is controlled at the optical axis correction device 70 so as to control a rotating angle around the Y-axis of the mirror holder 74.

Similarly, the X-axis driving mechanism 78X is also comprised of a bobbin 78Xa, a coil 78Xb, a yoke 78Xc, and a magnet (not shown), thereby a rotting angle around the X-axis of the mirror holder 74 is controlled.

On the base plate 75 are fixed a Y-axis angle sensor 79 and an X-axis angle sensor (not shown). The X-axis driving mechanism 78 and the Y-axis driving mechanism 78 are controlled at the optical axis correction device 70 in response to angle sensing signals attained from these Y-axis angle sensor 79 and the like and further controls an angle of a reflection surface 72a of the mirror 72. With such an arrangement as above, the optical axis is controlled for its correction.

In such an optical axis correction device 70, the reflection surface 72a of the mirror 72 is fixed in such a way that it may be coincided with a central plane of a plate thickness of the double-axis spring 71. Thus, even if the mirror 72 is rotated, its position in its Z-axis direction is not displaced.

In view of the foregoing, as a distance between the component parts of the optical system is changed in the optical spatial transmission device, a focal distance is changed, resulting in that a received light from the mating device, for example, does not make any focusing point at the light receiving plane of the position sensing sensor 38. As a result, the position of the optical axis of the received light from the mating device can not be detected accurately and an accurate optical axis correction can not be performed.

In view of the foregoing, the optical axis correction device 70 disclosed in Japanese Patent Application No. Hei 10-014533 was operated such that light beams across the optical axis correction device 70 in the optical system were made into parallel beams and even if the position of the reflection surface 72a of the mirror 72 was changed, no influence was applied to the focusing distance. In addition, as described above, the reflection surface 72a of the mirror 72 was fixed in such a way that it might be coincided with a central plane of plate thickness of the double-axis spring 71 so as to prevent the reflection surface 72a from being displaced toward a direction of Z-axis. With such an arrangement as above, since a distance between the lens 35 and each of the beam splitter 33, the position sensing sensor 38 and the light receiving element 40 and the like is not changed, it is possible to prevent a focusing point from being displaced and further an accurate correction can be carried out.

However, in the case that the received lights from the mating device passed through the lens 35 are changed into parallel beams before the optical axis correction device 70, it is necessary to make the received lights in parallel from each other through assembly adjustment of the lenses 34, 35. Even if an accurate assembly adjustment can be carried out, there is a possibility that characteristics of the lenses 34, 35 are changed in response to a variation in temperature and the received beams may not become in parallel from each other. For example, in the case that the device of which assembly adjustment was carried out at a room temperature of 20° C. is installed at a site showing a surrounding atmosphere temperature of 40° C., the lenses 34, 35 or the like are influenced by a variation in temperature, and the received lights are not made in parallel from each other before the optical axis correction device 70.

In turn, in the case that the reflection surface 72a of the mirror 72 was coincided with the central plane of the wall thickness of the double-axis spring 71, there was a problem that the heavy component elements such as the mirror holder 74 or yokes 78Xc, 78Yc or the like were concentrated below the center of rotation as apparent from FIG. 16, so that an inertia moment of the lower portion in respect to the rotating axes (X-axis, Y-axis) was increased and a responding speed of rotation of the mirror 72 in respect to the displacement of the optical axis was made inferior.

SUMMARY OF THE INVENTION

The present invention has been accomplished in view of the points described above and it is an object of the present invention to provide an optical axis correction device capable of preventing a displacement of focal point and increasing a responding speed of rotation of the mirror.

In order to eliminate the aforesaid problems, the present invention provides an optical axis correction device for correcting an optical axis within an optical spatial transmission device comprising a mirror reflecting a laser beam; a mirror holding member for holding said mirror; a supporting member for supporting said mirror holding member rotatably around a first axis and a second axis on a plane in parallel with the reflection surface of said mirror and displaceable in a third axis direction perpendicular to each of said axes; a rotating mechanism for independently rotating said mirror around each of said first axis and second axis; a rotating angle sensing mechanism for sensing a rotating angle of said mirror around each of said axes; rotation control means for controlling said rotating mechanism in such a way that each of the rotating angles of said mirror around said first axis and second axis may become a desired angle and that the portion of said laser beam on said reflection surface is directly reflected may keep its position in respect to said third axial direction.

In such an optical axis correction device as described above, a rotating angle of the mirror is sensed by a rotating angle sensing mechanism and correspondingly rotation control means controls the rotating mechanism. At this time, the rotation control means controls the mirror in such a way that each of rotating angles of the mirror around the first axis and the second axis may become a desired angle, respectively. In general, in the case that the reflection surface of the mirror and the plane including the rotating axis are not coincided to each other, the mirror is also rotated around the first axis and the second axis, resulting in that the portion of the mirror where beam reflects is displaced in a third axial direction as the rotation is performed. However, the supporting member of the present invention supports the mirror holding member in such a way that it can be displaced and adjusted in a third axial direction, so that a rotating amount of it around the first axis and the second axis is adjusted in consideration of the displacement toward the third axial direction as it rotates and so it can be controlled in such a way that the portion where the laser on the reflecting surface directly reflects may keep its substantial position against the third axial direction.

Accordingly, even if the rotating axes (the first axis and the second axis) are set such that a rotating moment of the mirror and a rotating moment of the mirror holding member are not displaced, the displacement of the reflecting portion can be prevented, resulting in that a displacement of focusing point can also be prevented.

BRIEF DESCRIPTION OF THE DRAWINGS

FIGS. 9A and 9B illustrate a principle of motion of a reflection surface caused by a displacement between the reflection surface and a rotating axis, wherein FIG. 9A is a view for showing a variation of the reflection surface when the reflection surface is coincided with the rotating axis, and FIG. 9B is a view for showing a variation of the reflection surface when the reflection surface is different from the rotating axis.

DESCRIPTION OF THE PREFERRED EMBODIMENTS

Figure 1:
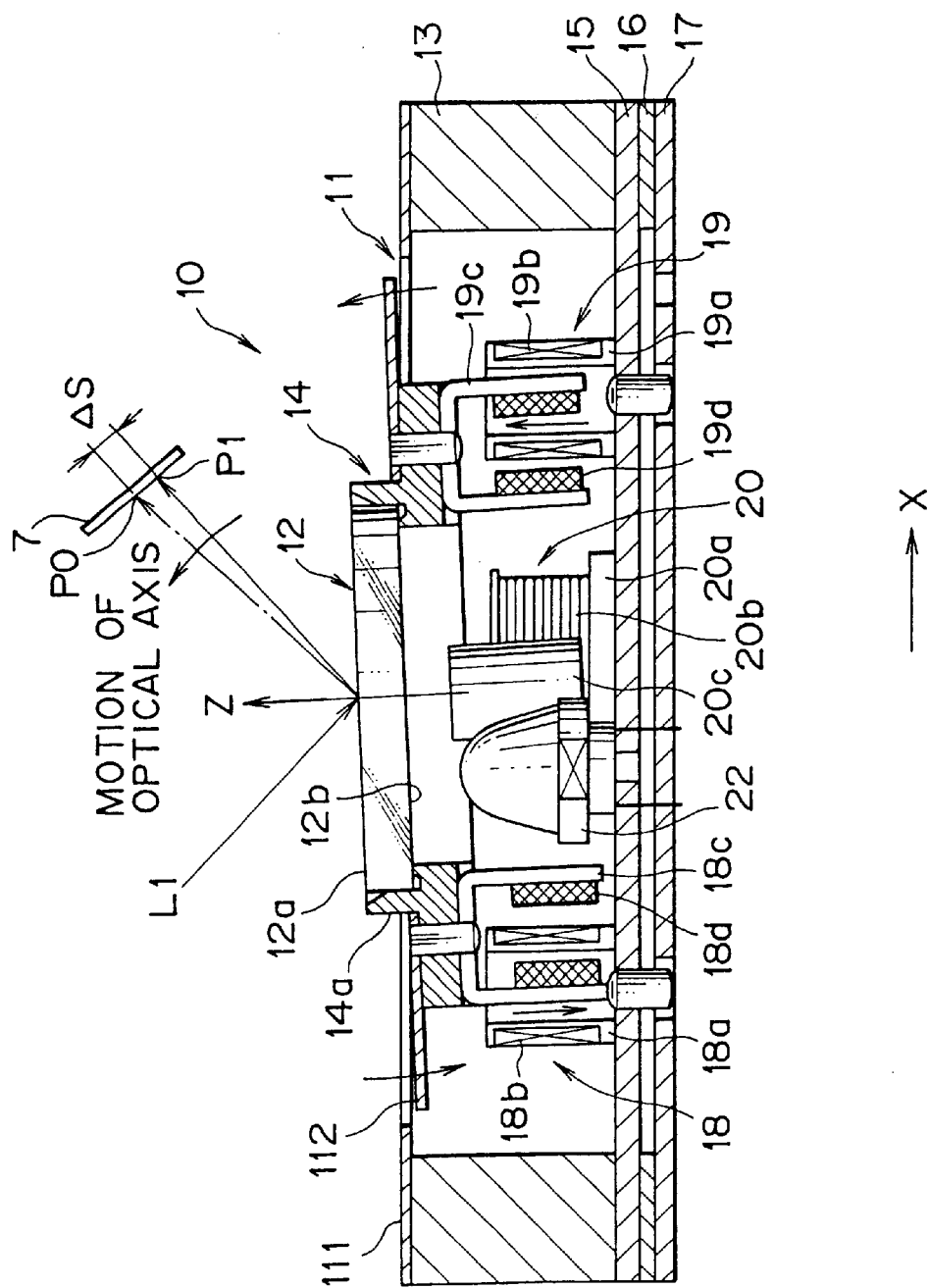
FIG. 1 is a side elevational view in section for showing a state in which a mirror is rotated around a Y-axis.

Referring now to the drawings, some preferred embodiments of the present invention will be described as follows.

Figure 2:
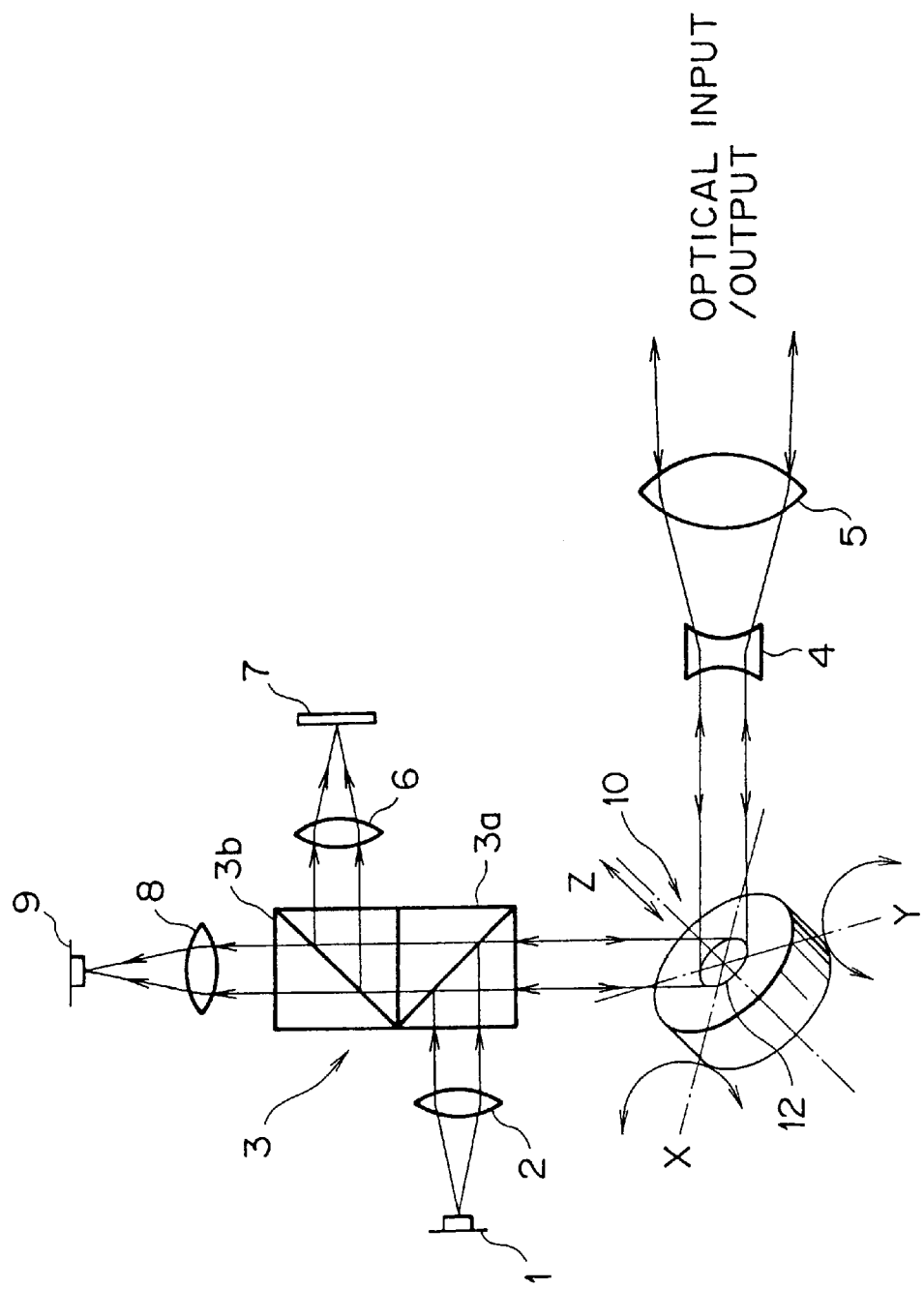
FIG. 2 is a view for showing a schematic configuration of an optical system segment of an optical spatial transmission device capable of performing an interactive optical communication which is provided with an optical axis correction device of the present preferred embodiment.

FIG. 2 is a view for showing a schematic configuration of an optical system segment of an optical spatial transmission device capable of performing an interactive optical communication which is provided with an optical axis correction device of the present preferred embodiment. In this optical spatial transmission device, the beam modulated in response to the transmission signal is outputted from the light emitting element 1 (for example, a semiconductor laser diode). The outputted beam is changed into parallel beams by a lens 2 and incident to a beam splitter 3a of a light separating section 3. The incident beam is reflected by the beam splitter 3a, outputted to an optical axis correction device 10, further reflected by this optical axis correction device 10, incident to a concave lens 4 and expanded. The beam expanded by the lens 4 is converted into parallel lights by a lens 5 constituting a major lens section together with the lens 4 and outputted toward the optical spatial transmission device of the transmission item.

To the contrary, the beam received from the mating device is received by the lens 5. After this beam is converted into parallel beams by the lens 4, it is reflected by the optical axis correction device 10 and incident to the light separating section 3. The incident beam passes through the beam splitter 3a and is incident to the beam splitter 3b. The beam splitter 3b divides the incident beam into a position sensing side and a signal receiving side. The light divided to the position sensing side is collected by a lens 6 and is incident to the position sensing sensor 7. The position sensing sensor 7 may detect a position of the incident light and transmits the sensing signal to a control circuit (not shown). At the control circuit, an angle control to be described later is carried out in response to the sensing signal.

In turn, the beam divided to the signal receiving side is collected by the lens 8 and incident to the light receiving element 9. The light receiving element 9 converts the incident beam into an electrical signal and sends it to a signal receiving circuit as a received signal. At the signal receiving circuit, the received signal is demodulate d and recovered to its original data.

In such a system as above, a rotating angle of the mirror 12 of the optical axis correction device 10 around two axes, i.e. around an X-axis and a Y-axis is adjusted. With such an arrangement as above, it is corrected such that an optical axis always passes through a specified path.

Figure 3:
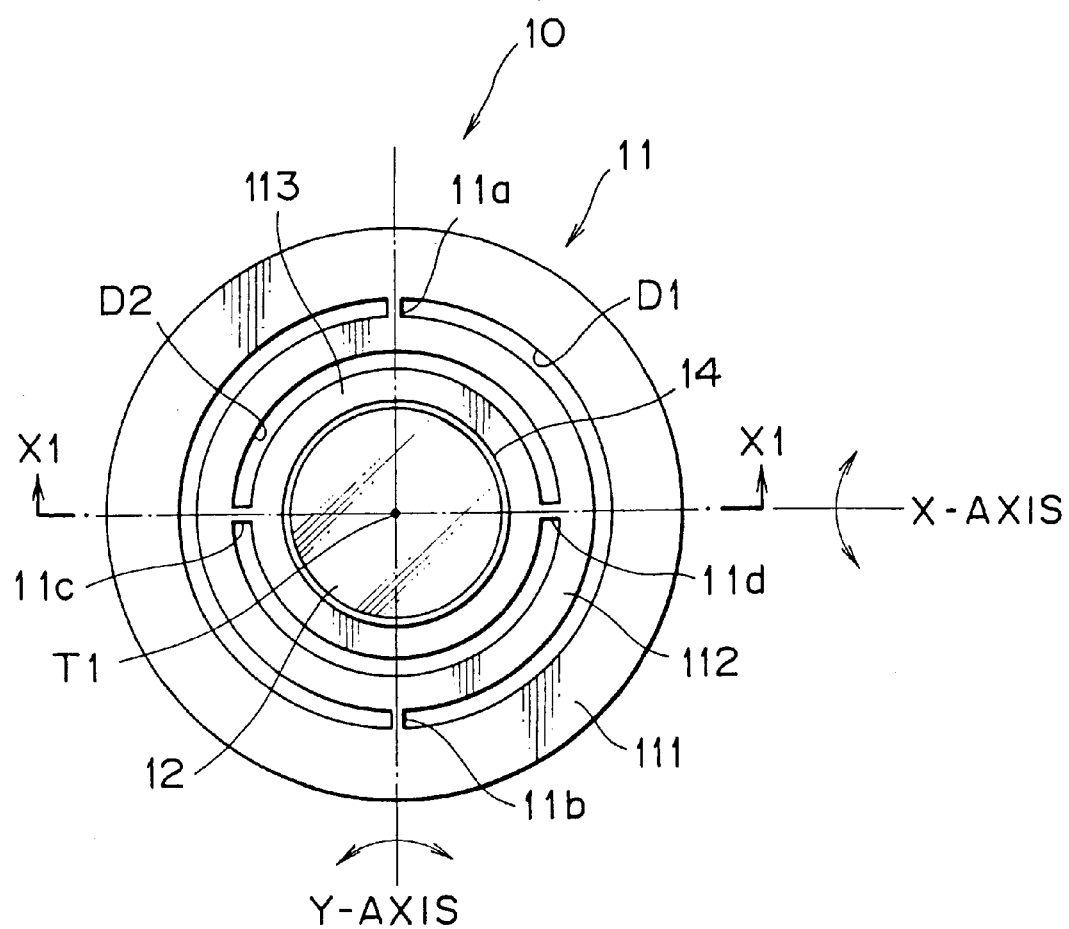
FIG. 3 is a top plan view for showing an optical axis correction device.

Then, a practical configuration of the optical axis correction device 10 will be described. FIG. 3 is a top plan view of the optical correction device 10.

The optical axis correction device 10 is constructed such that a double-axis spring 11 is fixed to the upper surface of the frame 13 to be described later. The double-axis spring 11 is a thin disk-like member having a resiliency, wherein it has three concentric rings 111, 112 and 113. The outer-most ring Ill is fixed to the frame 13. Between the outer ring 111 and the intermediate ring 112 is provided a clearance D1. The intermediate ring 112 is connected to the outer ring 111 in a twisted and rotatable manner by Y-axis bridges 11a, 11b formed such that they may be oppositely faced to each other on the Y-axis over a crossing point T1 between the X-axis and the Y-axis. With such an arrangement as above, the intermediate ring 112 can be rotated around the Y-axis in respect to the outer ring 111.

Between the inner-most inner ring 113 and the intermediate ring 112 is provided a clearance D2. The inner ring 113 is connected to the intermediate ring 112 in a twisted and rotatable manner by the X-axis bridges 11c, 11d formed on the X-axis with the crossing point T1 being held therebetween. With such an arrangement as above, the inner ring 113 can be rotated around the X-axis in respect to the intermediate ring 112. In addition, to the inner ring 113 is fixed a circular mirror 12 through the mirror holder 14.

Figure 4:
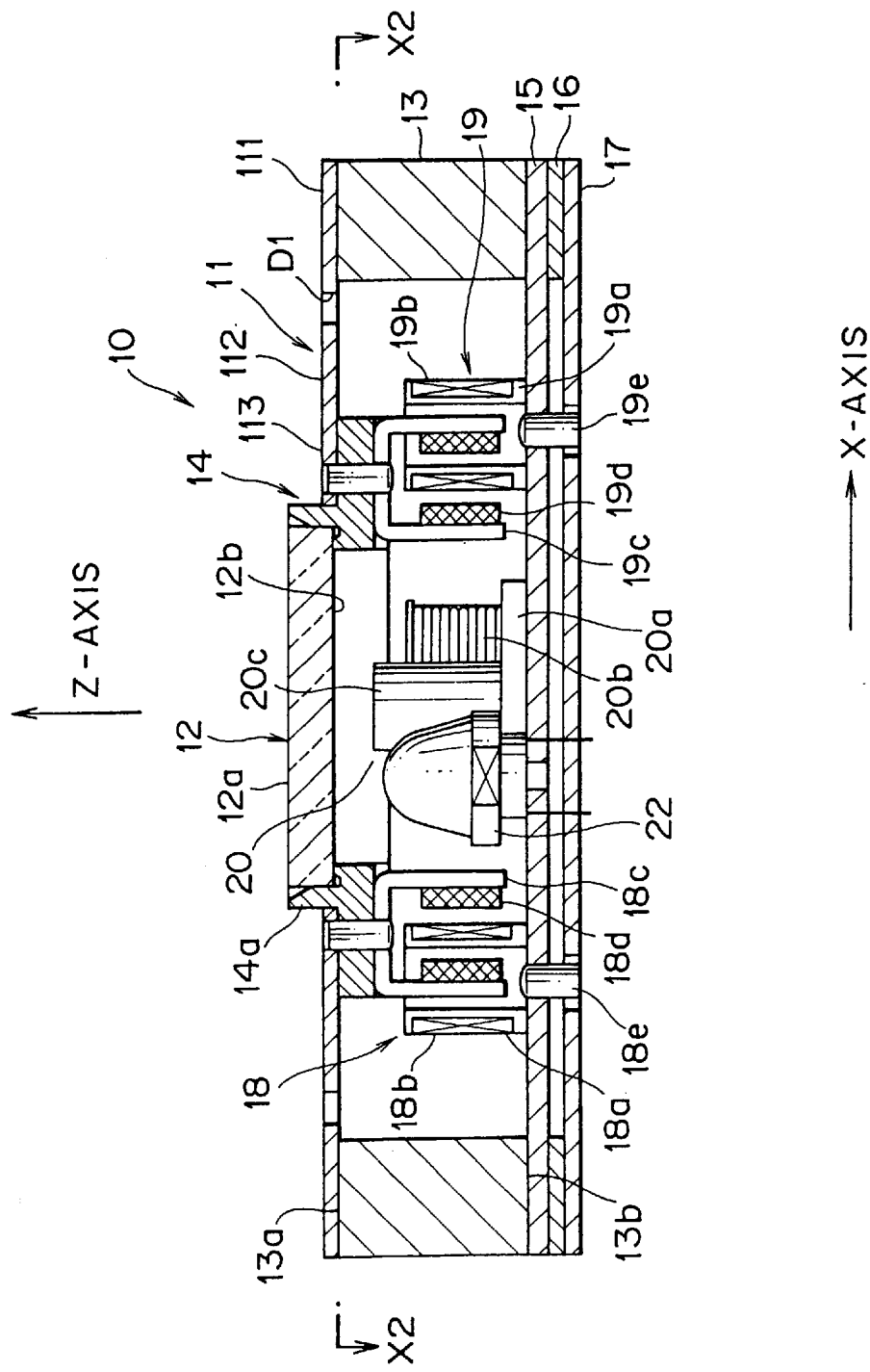
FIG. 4 is a sectional view taken along a line X1—X1 of FIG. 3.
Figure 5:
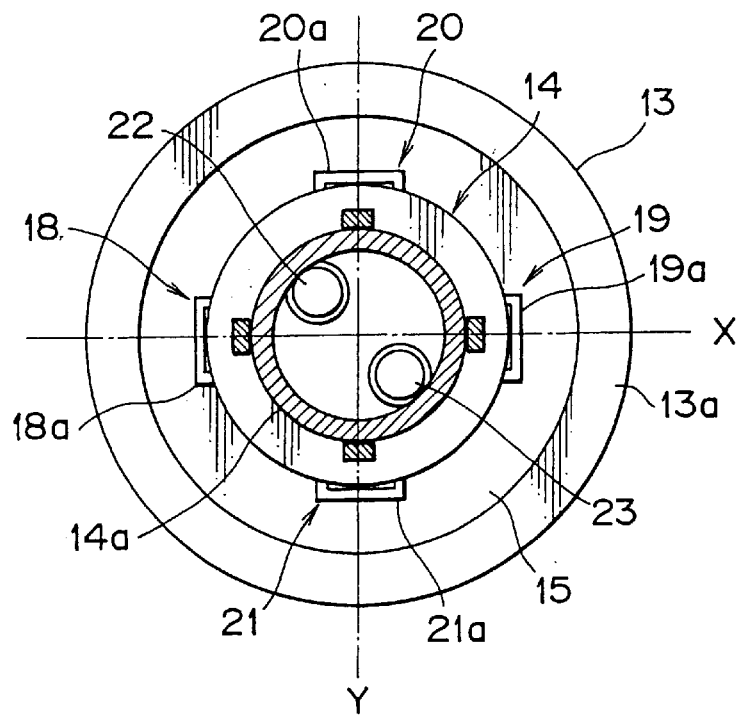
FIG. 5 is a sectional view taken along a line X2—X2 of FIG. 4.

FIG. 4 is a sectional view taken along a line X1—X1 of FIG. 3. In addition, FIG. 5 is a sectional view taken along a line X2—X2 of FIG. 4. As described above, the double-axis spring 11 is fixed to the upper surface 13a of the frame 13. To the inner ring 13 is fixed the mirror holder 14. This mirror holder 14 has a cylindrical holding section 14a protruded more upwardly than the upper surface of the double-axis spring 11 and the mirror 12 is held and fixed at the inner side of the holding section 14a. The mirror 12 is machined such that light is reflected not only at a front side reflecting surface 12a, but also at a rear surface 12b. A practical fixing structure of the mirror 12 will be described later.

To the lower surface 13b of the frame 13 is fixed a base plate 15. In addition, the base plate 7 is fixed to it through an annular spacer 16. On the base plate 15 are arranged the X-axis driving mechanisms 20, 21 (refer to FIG. 5) for rotating it around the X-axis in such a way that they may be oppositely faced to each other with the Z-axis being held therebetween and at a position displaced by 90° in respect to the Y-axis driving mechanisms 18, 19.

The Y-axis driving mechanism 18 is a so-called moving magnet type voice coil motor and mainly this mechanism is comprised of a bobbin 18a fixed to the base plate 15, a coil 18b wound around the bobbin 18a, a yoke 18c fixed to the mirror holder 14 and a magnet 18d fixed inside the yoke 18c. An electric current is flowed in the coil 18b wound around the bobbin 18a, thereby the magnet 18d may receive a force directed in response to a direction of the electric current and then the mirror holder 14 is rotated around the Y-axis. Similarly, the Y-axis driving mechanism 19 is also comprised of a bobbin 19a, a coil 19b, a yoke 19c and a magnet 19d. At the optical axis correction device 10, this device controls the operations of the Y-axis driving mechanism 18 and the Y-axis driving mechanism 19 and further controls a rotating angle of the mirror holder 14 around its Y-axis.

The base plate 15 is provided with a stopper 18e and a stopper 19e in correspondence with each of the Y-axis driving mechanism 18 and the Y-axis driving mechanism 19. Each of these stoppers 18e, 19e is arranged to restrict an amount of motion of each of the yokes 18c, 19c. The stoppers 18e, 19e can be adjusted in a vertical direction in respect to the base plate 15 and then an amount of motion of each of the yokes 18c, 19c can be adjusted.

In turn, an X-axis driving mechanism 20 is also comprised of a bobbin 20a, a coil 20b, a yoke 20c and a magnet (not shown) and the X-axis driving mechanism 21 opposing against the mechanism 20 is also comprised of a bobbin 21a, a coil (not shown), a yoke and a magnet. The X-axis driving mechanisms 20, 21 are similarly provided with a stopper (not shown). At the optical axis correction device 10, operations of this X-axis driving mechanism 20 and the X-axis driving mechanism 21 are controlled and a rotating angle of the mirror holder 14 around the X-axis is controlled. In addition, a practical controlling method for the rotating angle will be described later.

On the base plate 15 are fixed a Y-axis angle sensor 22 and an X-axis angle sensor 23 (refer to FIG. 5). The Y-axis angle sensor 22 and the X-axis angle sensor 23 are of an optical type sensor, wherein a light emitting element and a light receiving element are integrally arranged. The light from the light emitting element is reflected at the rear surface 12b of the mirror 12, the reflected light is detected by the light receiving element, thereby the element detects a rotating angle of the mirror 12 around the Y-axis and a rotating angle of the mirror 12 around the X-axis, respectively. At the optical axis correction device 10, the X-axis driving mechanisms 20, 21 and the Y-axis driving mechanisms 18, 19 are controlled in response to the angle sensing signals attained from these Y-axis angle sensors 22, 23 and then the angle of the reflection surface 12a of the mirror 12. With such an arrangement as above, an optical axis correction control is carried out.

Figure 6:
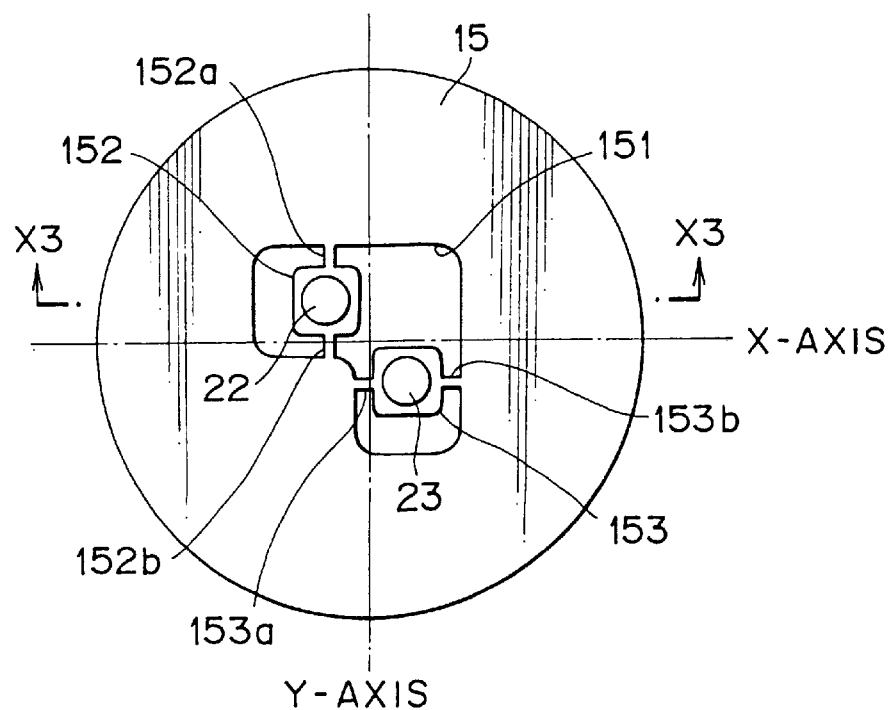
FIG. 6 is a top plan view for showing abase plate segment to indicate a fixing structure for a Y-axis angle sensor and an X-axis angle sensor.
Figure 7:
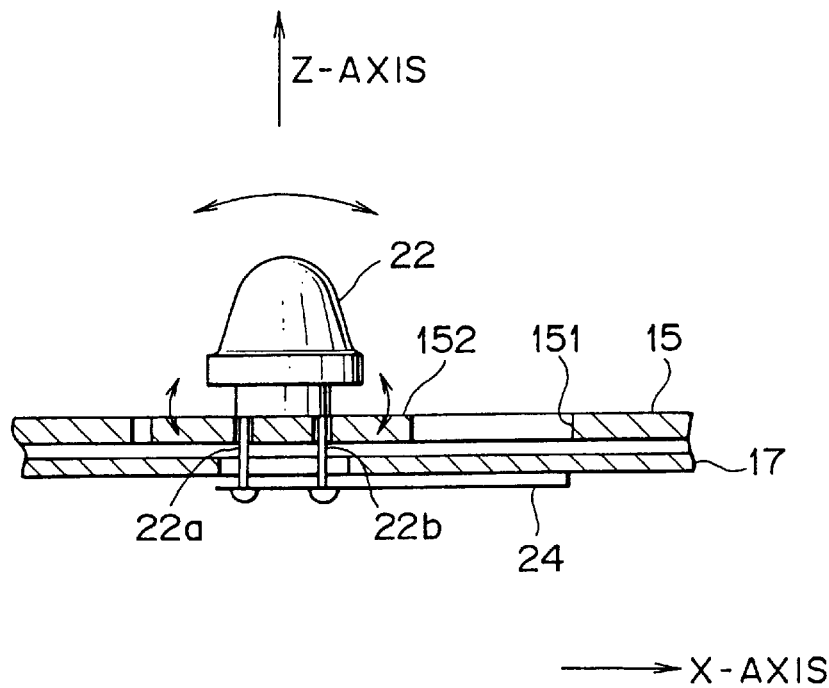
FIG. 7 is a sectional view taken along a line X3—X3 of FIG. 6.

FIG. 6 is a top plan view for showing a part of the base plate 15 to indicate a fixing structure for the Y-axis angle sensor 22 and the X-axis angle sensor 23. In addition, FIG. 7 is a sectional view taken along a line X3—X3 of FIG. 6. The base plate 15 is made of plastic deformable material and a hook-shaped recess 151 is formed at a sensor fixing portion. A sensor fixing piece 152 is formed at the recess 151. The sensor fixing piece 152 is connected to the base plate 15 through the bridges 152a, 152b. On the sensor fixing piece 152 is fixed the Y-axis angle sensor 22. In addition, the recess 151 is formed with a sensor fixing piece 153. The sensor fixing piece 153 is connected to the base plate 15 through the bridges 153a, 153b. On the sensor fixing piece 153 is fixed the X-axis angle sensor 23.

As shown in FIG. 7, the Y-axis sensor 22 is made such that the terminals 22a, 22b pass up to the rear side of the base plate 17 and they are electrically fixed to the base plate 17. The Y-axis angle sensor 22 keeps a degree of freedom in respect to the base plate 15 through the flexible base plate 24. When an origin position of the mirror 12 and an angle of the Y-axis angle sensor 22 are coincided to each other, the angle is adjusted while monitoring an output of the Y-axis angle sensor 22, the bridges 152a, 152b of the sensor fixing piece 152 are twisted by an appropriate force, thereby an orientation of the Y-axis angle sensor 22 can be set at its desired angle. With such an arrangement as above, the adjustment can be easily performed and its working efficiency is improved.

The X-axis angle sensor 23 is also connected to the base plate 17 under a configuration similar to that of the Y-axis angle sensor 22 and its angle can be adjusted and set.

As described above, a non-contact type sensor is used as the Y-axis angle sensor 22 and the X-axis angle sensor 23, no influence is applied to the operation of the mirror 12.

Thus, it becomes possible to perform an optical axis correction of high precision. In addition, the angle sensing operation for the mirror 12 is carried out by radiating light against the rear surface 12b of the mirror 12, is that its structure is simple, its small-sized and light weight formation can be attained.

In addition, since the base plate 17 for controlling the Y-axis driving mechanisms 18, 19 in the present preferred embodiment of the present invention is integrally assembled with the optical axis correction device 10, the Y-axis driving mechanisms 18, 19 or the like can be directly installed, resulting in that the wirings can be simplified. With such an arrangement as above, it is possible to attain an entire small-sized device, improve a reliability in quality caused by loss of wiring and to reduce its cost.

Then, the practical fixing structure of the mirror 12 as well as its function will be described.

Figure 8:
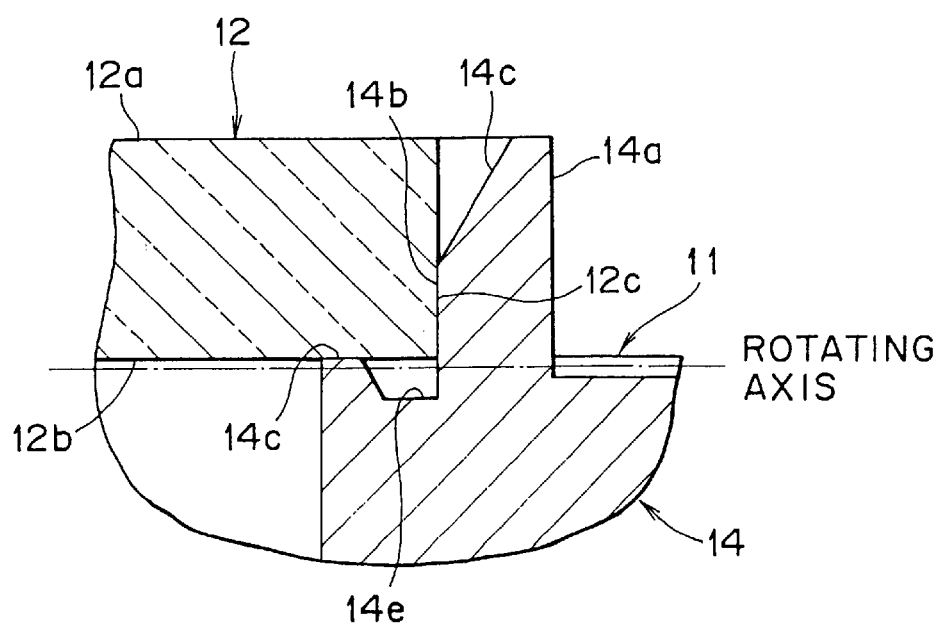
FIG. 8 is a view for showing a structure for fixing a mirror to a mirror holder.

FIG. 8 is a view for showing a fixing structure of the mirror 12 to the mirror holder 14. The mirror 12 is installed such that its side surface 12c is closely contacted with the inner surface 14b of the holding part 14a of the mirror holder 14 and further such that it is installed on the installing surface 14c. At this time, the reflection surface 12a and the rear surface 12b of the mirror 12 are in parallel with the double-axis spring 11.

There is formed an annular recess 14c at an inner upper end of the holding part 14a. In addition, there is also formed an annular groove 14e at the inner surface 14b of the mounting surface 14c. Adhesive agent is poured into the recess 14c under a state in which the mirror 12 is installed. With such an arrangement as above, the mirror 12 is positively fixed to the mirror holder 14. In addition, even if the adhesive agent within the recess 14c is flowed down from a clearance between the mirror 12 and the inner surface 14b, the adhesive agent is accumulated in the groove 14e and the adhesive agent can be prevented from being flown out to the mounting surface 14c. With such an arrangement as above, since the rear surface 12b of the mirror 12 is not adhered to the mounting surface, it is possible to prevent the mirror 12 from being warped or strained.

As apparent from FIGS. 4 and 8, the mirror 12 is fixed to the mirror holder 14 under a state in which it is projected out more upwardly than a twisting rotating axis of the double-axis spring 11. This projecting amount is adjusted such that an inertia moment of the double-axis spring 11 around its rotating axis is not deflected to one side. That is, it is adjusted such that a weight of the upper side portion of the double-axis spring 11 and the lower side portion of the double-axis spring 11 are well-balanced. With such an arrangement as above, a responding speed when the mirror 12 is rotated is made fast.

Then, operation of the optical axis correction device 10 having the aforesaid configuration as above will be described.

FIG. 1 is a side elevational view in section for showing a state in which the mirror 12 is rotated around the Y-axis. In this figure, the sectional view is taken along an X-axis. As an incident light L1 is reflected against the reflection surface 12a of the mirror 12 and radiated against the position sensing sensor 7, a displacement amount between an incident point P1 on the position sensing sensor 7 and a reference position P0 is detected at the optical axis correction device 10. In this case, it is assumed that a displacement amount around the Y-axis is defined as $\Delta S$.

The optical axis correction device 10 drives the Y-axis driving mechanisms 18, 19 to correct the optical axis by this displacement amount $\Delta S$ only and then changes an angle of the reflection surface 12a of the mirror 12. More practically, in the case that the mirror 12 is rotated in a counter-clockwise direction as viewed in the figure, a current of minus-direction, for example, is flowed in the coil 18b of the left side Y-axis driving mechanism 18 to apply a force for drawing down the yoke 18c. In turn, a current of plus-direction is flowed in the coil 19b of the right side Y-axis driving mechanism 19 to apply a force for pushing up the yoke 19c. With such an arrangement as above, the intermediate ring 112 is rotated in a counter-clockwise direction as viewed in FIG. 1 around the center of the bridges 11a, 11b shown in FIG. 3, and the inner ring 113, the mirror holder 14 and the mirror 12 are rotated together with the intermediate ring. Then, the rotation of the mirror 12 is stopped at a location where the point P1 on the position sensing sensor 7 is coincided with the reference position P0. In this way, the optical axis is corrected.

However, the reflection surface 12a of the mirror 12 is not coincided with the rotating axis in the configuration of the present preferred embodiment, so that a mere rotation of the mirror 12 causes the position of the reflection surface 12a in the Z-axis direction to be moved and a distance between the component elements in the optical system to be changed.

Figure 9A:
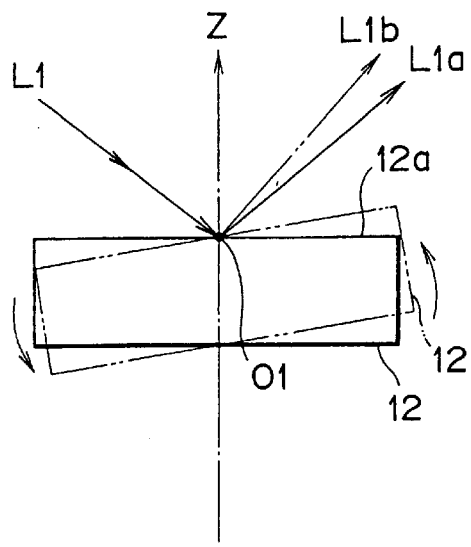
Figure 9B:
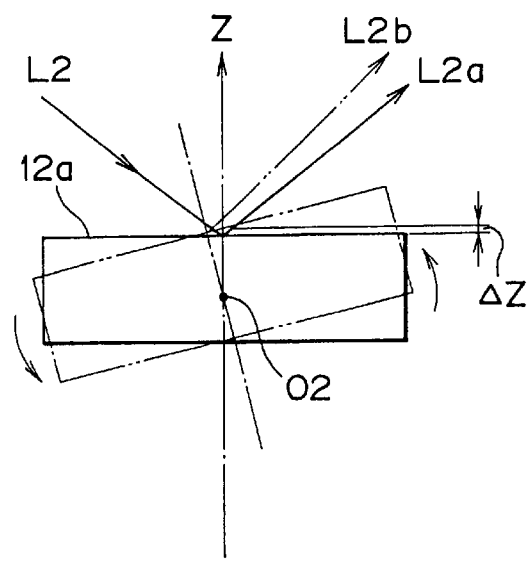

FIGS. 9A and 9B are views for illustrating a principle of motion of the reflection surface 12a caused by a displacement between the reflection surface 12a and the rotating axis, wherein FIG. 9A is a view for showing a variation of the reflection surface 12a when the reflection surface 12 is coincided with the rotating axis, and FIG. 9B is a view for showing a variation of the reflection surface 12a when the reflection surface 12a is different from the rotating axis. At first, as shown in FIG. 9A, when the reflection surface 12a is coincided with the rotating axis O1, each of the reflection lights L1a, L1b of the incident light L1 shows its changed orientation only with the same rotating angle under a state in which the mirror 12 is in parallel and another state in which the mirror 12 is rotated as indicated by a dotted line shown in the figure. At this time, since there occurs no motion of the reflection point toward the direction of Z-axis, no change occurs in the distance between the component parts of the optical system.

However, when the reflection surface 12a is not coincided with the rotating axis O2 as shown in FIG. 9B, not only the reflecting position of the incident light L2 is made different, but also a displacement of $\Delta Z$ is produced in an upward direction of the Z-axis. Due to this fact, a distance between the component parts in the optical system becomes different before its rotation and after its rotation, respectively, resulting in that an optical path length of the reflection light L2a before rotation and an optical path length of the reflection light L2b after rotation are made different. Under such a condition as above, an accurate optical axis correction can not be carried out.

In view of the foregoing, in the preferred embodiment of the present invention, the mirror 12 is also corrected in the direction of Z-axis under a utilization of flexing of the intermediate ring 112 of the double-axis spring 11 when the rotation of the mirror 12 is controlled in response to an amount of displacement of the optical axis detected by the position sensing sensor 7. It is normally carried out that in the case of rotating the mirror 12 around the Y-axis in a counter-clockwise direction, a driving force of "−1", for example, is applied to the left side Y-axis driving mechanism 18 indicated in FIG. 1 and concurrently a driving force of "+1" is applied to the right side Y-axis driving mechanism 19. In this case, a downward direction is defined as a minus and an upward direction is defined as a plus. As described above, applying a driving force equally to the right side and the left side causes the mirror to be displaced in a direction of Z-axis as shown in FIG. 9B.

In view of the foregoing, in the preferred embodiment, a driving force of "−2" is applied to the Y-axis driving mechanism 18 and concurrently a state of "±0" is kept at the Y-axis driving mechanism 19. With such an arrangement as above, it is possible that the mirror 12 is rotated only in the same direction by the same angle as those of the case in which the driving force of "−1" is applied to the Y-axis driving mechanism 18 and a driving force of "+1" is applied to the Y-axis driving mechanism 19, respectively, without being displaced in the direction of Z-axis as shown in FIG. 9A. Further, as an example of another pattern, a driving force of "−3" is applied to the Y-axis driving mechanism 18 and concurrently a driving force of "−1" is applied to the Y-axis driving mechanism 19. With such an arrangement as above, it is possible that the mirror is rotated by the same angle as that of the aforesaid pattern and an amount of motion of the mirror in a minus direction of the Z-axis is increased.

In addition, in the case that it is desired to rotate the mirror in a clockwise direction, a driving force of pattern opposite to clockwise rotation is applied, for example, wherein a driving force of "−3" is applied to the right side Y-axis driving mechanism 19 and concurrently a driving force of "−3" is applied to the left side Y-axis driving mechanism 18, respectively. With such an arrangement as above, it is possible to rotate the mirror in a clockwise direction only by a desired angle without being displaced toward the direction of Z-axis.

In addition, for a sake of convenience in description, although the expressions of the driving force of "−1" and the driving force of "−3" have been used, actually, this is controlled in response to a value of current supplied to the coil. In addition, this value is properly adjusted in reference to some parameters such as a distance between the reflecting portion of the mirror 12 and a center of rotation or a rotating angle of the mirror 12 and the like.

As described above, a reason why a displacement in a direction of Z-axis can be prevented by making absolute values of the right driving force and the left driving force consists in the fact that the intermediate ring 112 of the double axis spring 11 has a capability that it is flexed toward a direction of Z-axis.

Figure 10:
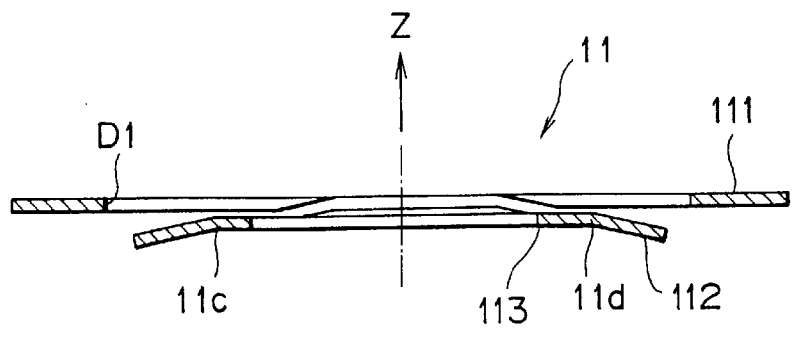
FIG. 10 is a sectional view for illustrating a flexing function of double-axis spring.

FIG. 10 is a sectional view for illustrating a flexing function of the double-axis spring 11. In this figure, a section taken along the X-axis is shown. In this case, this figure shows a case in which the intermediate ring 112 is flexed in a direction of minus in Z-axis. The double-axis spring 11 is entirely formed by a resilient member and concurrently since the outer ring 111 is fixed to the frame 13 shown in FIG. 1, the inner ring 113 having the Y-axis driving mechanisms 18, 19 is pulled downwardly, thereby the intermediate ring 112 can be flexed downwardly at the bridges 11a, 11b (refer to FIG. 3). With such an arrangement as above, it becomes possible that the reflecting portion is prevented from being displaced by ΔZ in an upward direction of the Z-axis. Thus, an accurate optical axis correction can be performed.

In addition, in FIG. 10 is shown the state of the double-axis spring 11 when it is rotated around the Y-axis and in turn when it is rotated around the X-axis, the inner ring 113 is flexed at the bridges 11c and 11d. Other actions than the above are substantially the same as those performed around the Y-axis.

In accordance with the preferred embodiment of the present invention, since it is not necessary to cause the reflection surface 12a of the mirror 12 to be coincided with the rotating axis, a degree of freedom in design is increased and an entire small-sized and light weight device can be attained.

Further, although a focal distance between the lens 5 shown in FIG. 2 and another optical component such as the light emitting element 1 was adjusted in reference to a machining accuracy and an assembling accuracy of the parts in the prior art, the device is constructed as disclosed in the preferred embodiment of the present invention, thereby the reflection surface 12a of the mirror 12 is moved in a direction of Z-axis and that is, the origin of the reflection surface 12a in a direction of Z-axis is offset to enable the focal distance to be set strictly in accordance with its design and further a troublesome adjustment in assembling operation in the prior art to be reduced. Further, since the machining accuracy for the component parts can also be reduced, its cost can be decreased.

In addition, even in the case that a characteristic of the optical system is changed due to a variation in temperature or the like, the reflection surface 12a of the mirror 12 is moved in a direction of Z-axis to enable a displacement of the focal distance to be adjusted and the transmitted or received lights can be kept in parallel from each other. Accordingly, it is possible to prevent a displacement of focal point from being attained.

In addition, although the example in which the moving magnet type voice coil motor is used as the Y-axis driving mechanisms 18, 19 is shown in the preferred embodiment of the present invention, it is also possible to apply a so-called moving coil in which the coil is fixed to the mirror holder 14 and moved. Since both the moving magnet type motor and the moving coil type motor are actuators having no backlash, an accurate control becomes possible. Further, its responding speed is also made fast.

Additionally, in the preferred embodiment of the present invention, although the shape of the mirror 12 is formed as a circle, its shape can be properly changed to an ellipse or the like in response to a sectional shape of the reflected light.

Figure 11:
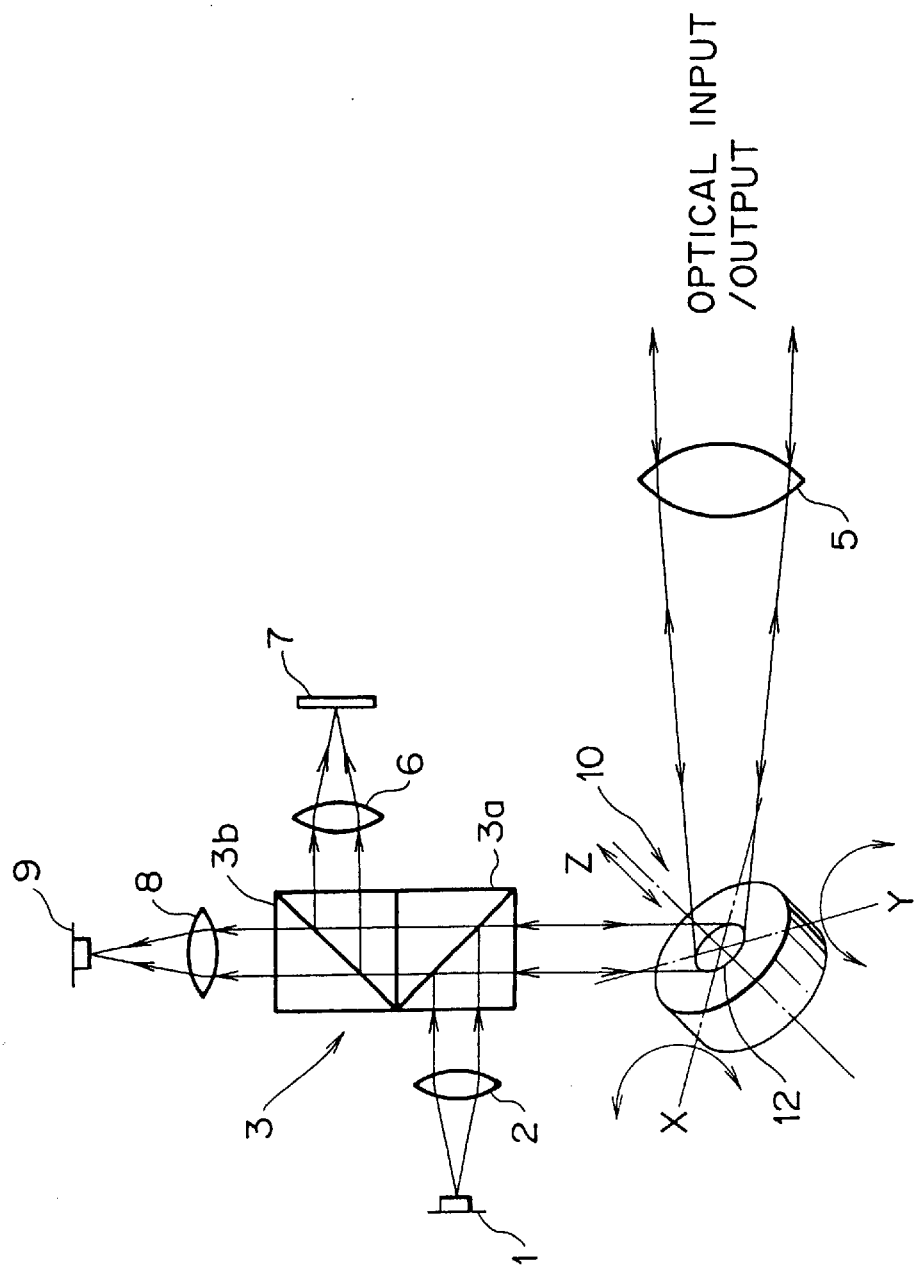
FIG. 11 is a view for showing another example of configuration of an optical system segment of an optical spatial transmission device.
Figure 12:
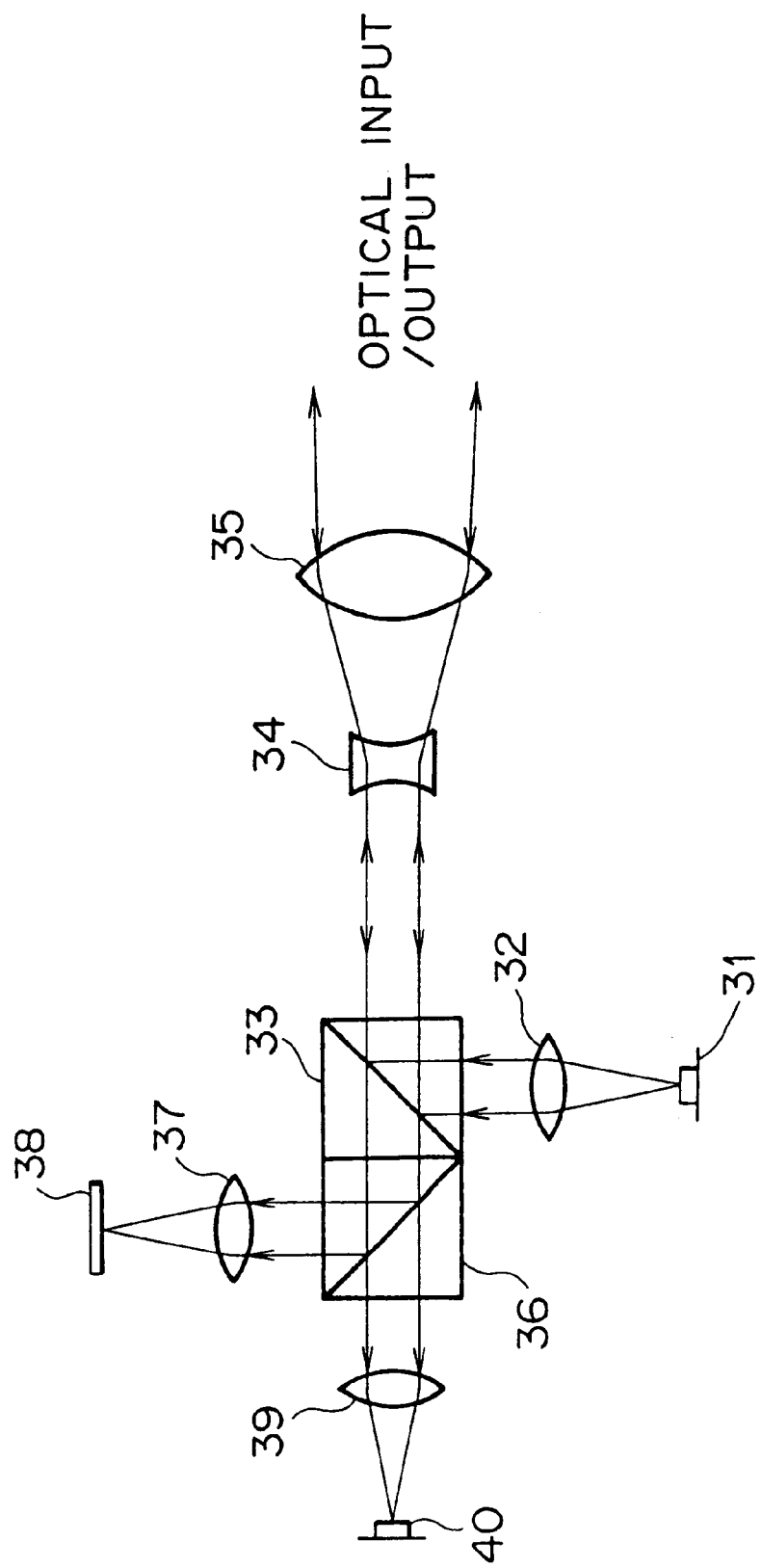
FIG. 12 is a view for showing a schematic configuration of an optical system segment of an optical spatial transmission device capable of performing an interactive optical communication.
Figure 13:
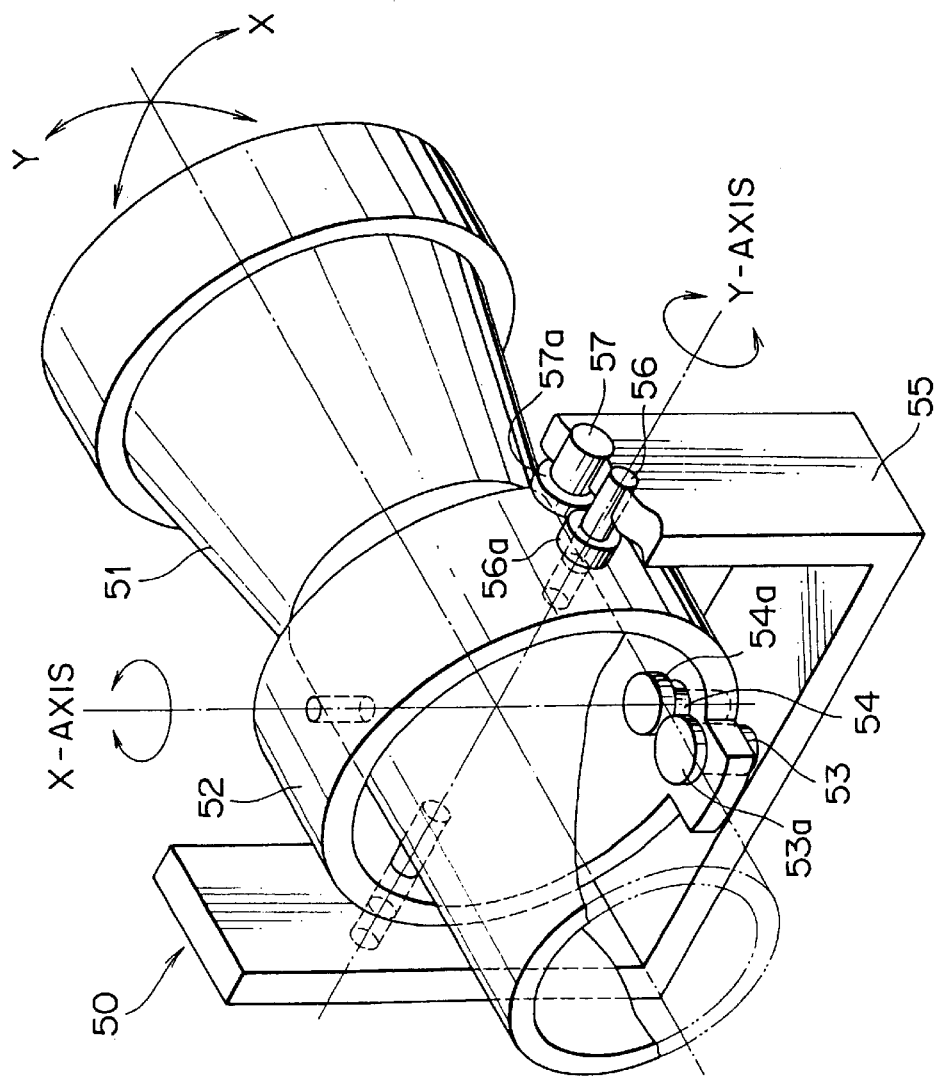
FIG. 13 is a view for showing a first example of the prior art optical axis correction device.
Figure 14:
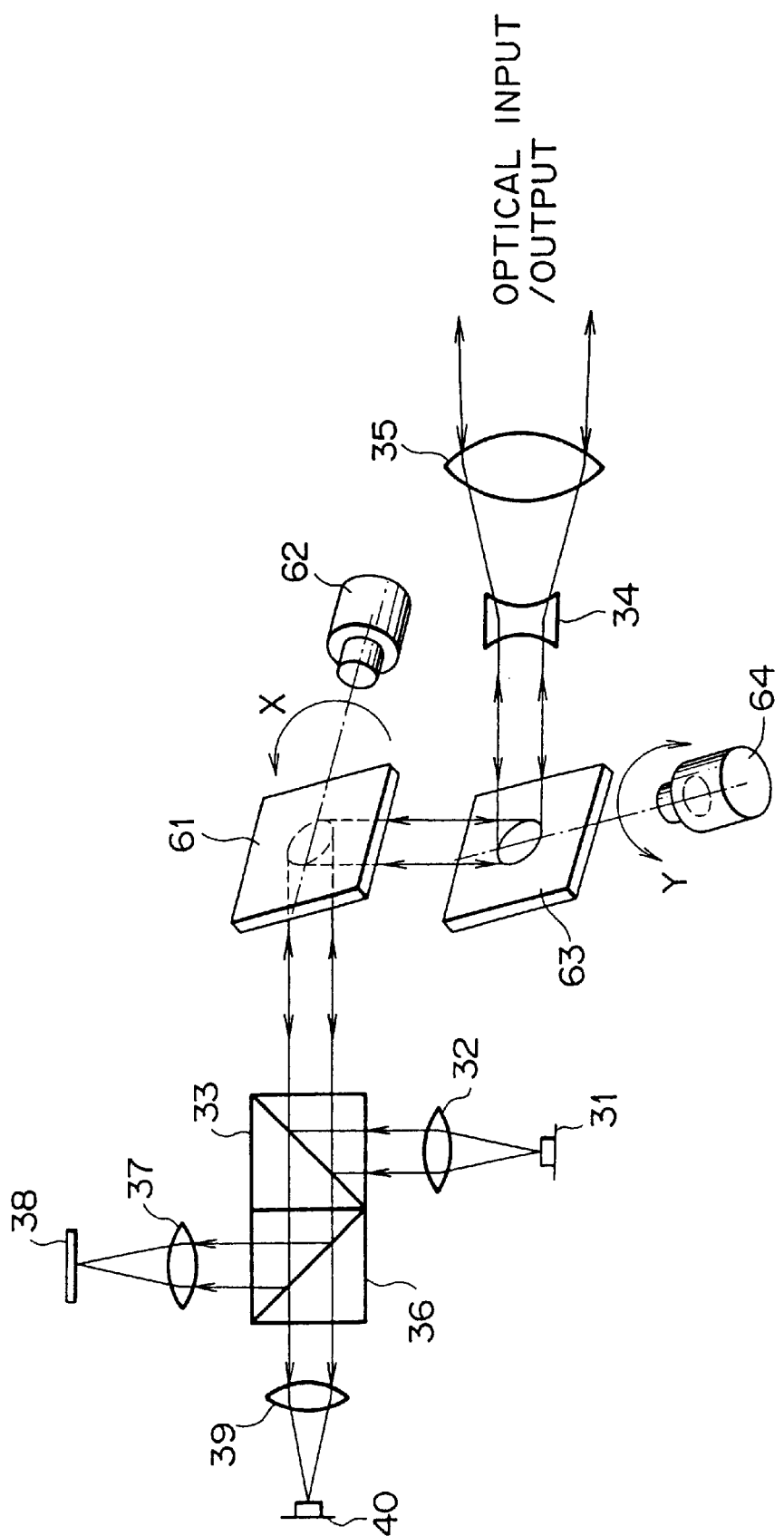
FIG. 14 is a view for showing a second example of the prior art optical axis correction device.
Figure 15:
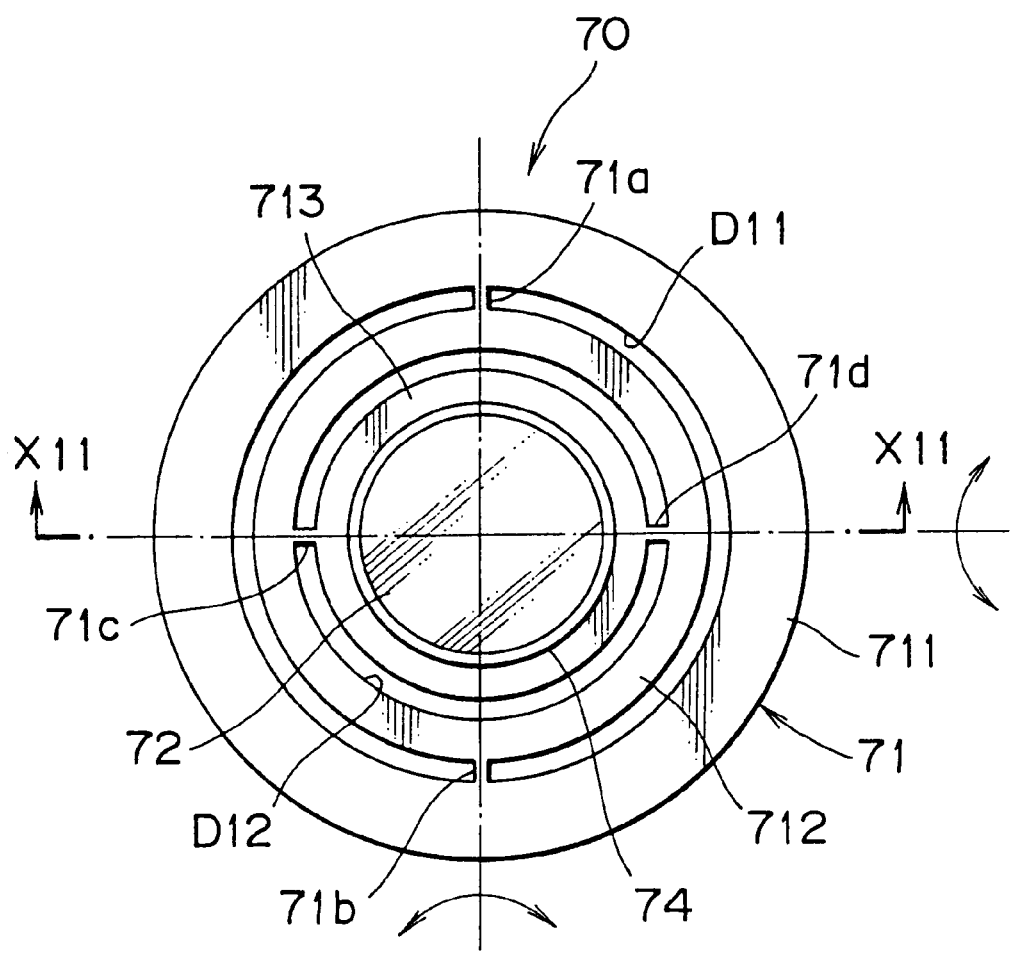
FIG. 15 is a top plan view for showing a configuration of an optical axis correction device shown in Japanese Patent Application No. Hei 10-014533.
Figure 16:
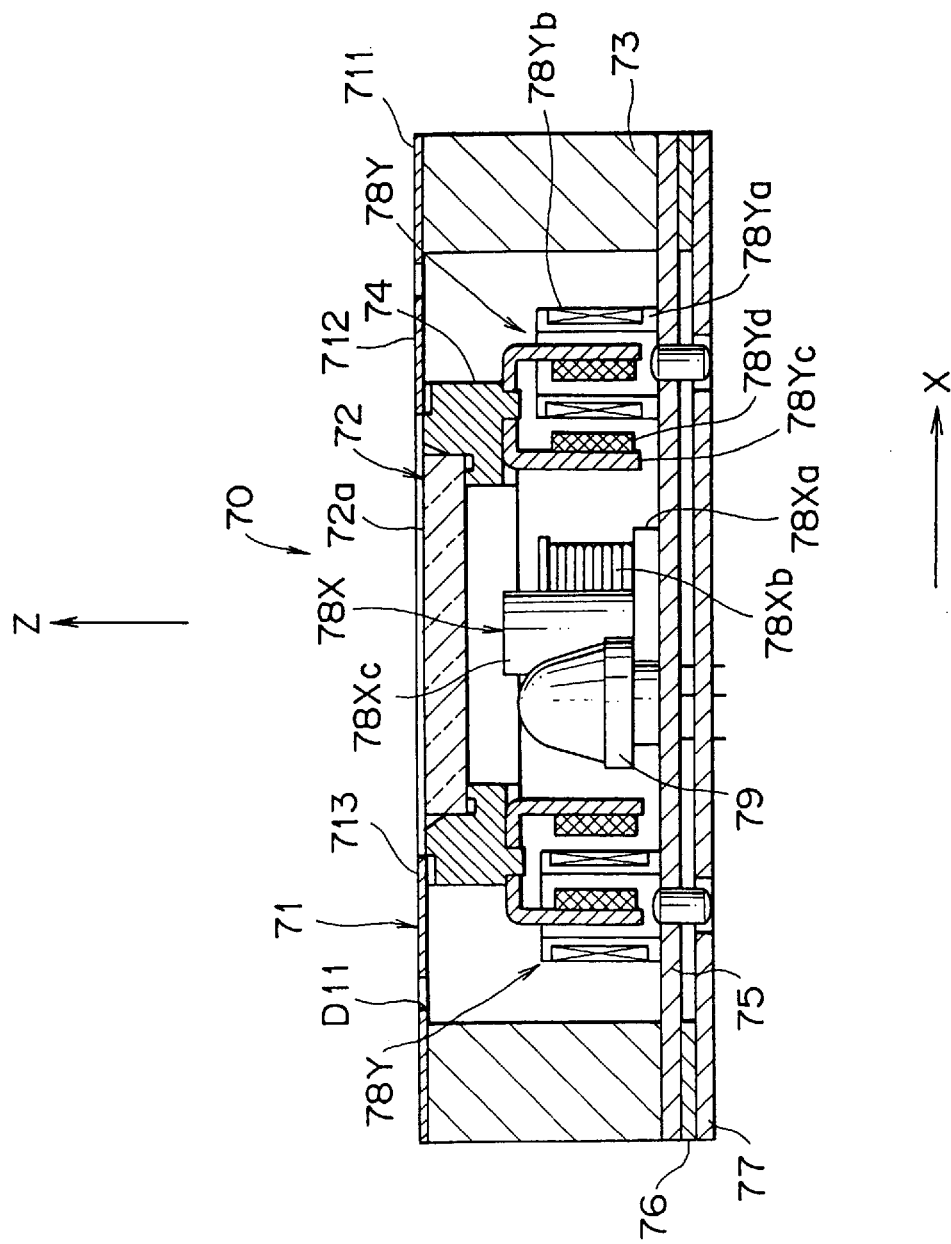
FIG. 16 is a sectional view taken along a line X1—X1 of FIG. 15.

Further, the preferred embodiment of the present invention has a configuration in which the received light is changed into parallel light by the lens 4 as shown in FIG. 2, although it may have a configuration having no lens 4 at all as shown in FIG. 11. With such an arrangement as above, it is possible to simplify the configuration of the major lens segment. In addition, since the diameter of light subsequent to the lens 4 can be reduced, the diameter of the mirror 12 of the optical axis correction device 10 can be reduced or other optical component parts such as beam splitters 3a and 3b or the like can be made in small-size. Thus, the entire optical spatial device can be reduced in size and its manufacturing cost can be reduced.

As described above, the present invention is constructed such that there is provided the supporting member for supporting the mirror holding member in such a way that it may be rotated around the first and second axes on a plane in parallel with the reflection surface of the mirror and displaced in a third axial direction perpendicular to each of the axes, each of the rotating angles around the first and second axes of the mirror may be controlled to have a desired angle, respectively, and concurrently it is controlled in such a way that the portion of laser beam on the reflection surface may keep its position in respect to the third axial direction, resulting in that even if the rotating axes (the first axis and the second axis) are set so as to prevent the axial displacement of the reflection part in the third axial direction from being carried out.

Thus, the responding speed for the correcting operation can be made fast and the focal distance between the optical component parts is not varied, so that a displacement of focal point can be prevented.

What is claimed is:

1. An optical axis correction device for correcting an optical axis within an optical spatial transmission device comprising:

a mirror for reflecting a laser beam;

a mirror holding member for holding said mirror;

a supporting member for supporting said mirror holding member rotatably around a first axis and a second axis in a plane parallel with the reflection surface of said mirror and displaceable in a third axial direction perpendicular to each of said axes;

a rotating mechanism for independently rotating said mirror around each of said first axis and said second axis;

rotating angle sensing mechanism for sensing a rotating angle of said mirror around each of said axes; and rotation control means for controlling said rotating mechanism such that said reflection surface of said mirror is displaced in said third axial direction whereby the laser beam is incident on said mirror at the same location notwithstanding the rotation of said mirror.

2. An optical axis correction device according to claim 1, wherein two of said rotation mechanisms are arranged for each axis to be opposed around said reflection portion and said rotation control means controls such that an amount of operation of said two rotating angle sensing mechanisms is symmetrical.

3. An optical axis correction device according to claim 1, wherein said supporting member is comprised of three concentric rings, the outer-most ring being fixed to a case, said outer-most ring and the intermediate ring connected under a state in which they can be twisted and rotated around said first axis, and in turn, said intermediate ring and the inner-most ring are connected under a state in which they can be twisted and rotated around said second axis.

4. An optical axis correction device according to claim 1, wherein said mirror is connected to said holding member at its side surface.

5. An optical axis correction device according to claim 1, wherein said rotating mechanism is comprised of a voice coil motor.

6. An optical axis correction device according to claim 1, wherein the rear surface of said mirror can reflect light and there is provided a rotating angle sensing device for sensing a rotating angle of said mirror by reflecting the light against said rear surface.

7. An optical axis correction device according to claim 6, wherein said rotating angle sensing device is fixed in such a way that its angle in respect to said mirror can be adjusted.

* * * * *